United States Patent [19]
Kiehl

[11] Patent Number: 5,966,389
[45] Date of Patent: Oct. 12, 1999

[54] FLEXIBLE ECC/PARITY BIT ARCHITECTURE

[75] Inventor: Oliver Kiehl, Munich, Germany

[73] Assignee: Siemens Aktiengesellschaft, Munich, Germany

[21] Appl. No.: 08/603,409

[22] Filed: Feb. 20, 1996

Related U.S. Application Data

[63] Continuation of application No. 08/200,786, Feb. 22, 1994, abandoned.

[51] Int. Cl.$^6$ .................................................. G11C 29/00
[52] U.S. Cl. .......................................... 371/40.1; 371/40.2
[58] Field of Search ................................. 371/40.11, 40.2

[56] References Cited

U.S. PATENT DOCUMENTS

| | | | |
|---|---|---|---|
| 3,243,774 | 3/1966 | Betz | 340/146.1 |
| 3,387,261 | 6/1968 | Betz | 340/146.1 |
| 3,648,239 | 3/1972 | Carter et al. | 340/146.1 |
| 3,825,893 | 7/1974 | Bossen et al. | 340/146.1 |
| 3,836,957 | 9/1974 | Duke et al. | 340/146.1 |
| 4,360,915 | 11/1982 | Sindelar | 371/13 |
| 4,450,562 | 5/1984 | Wacyk et al. | 371/51 |
| 4,506,362 | 3/1985 | Morley | 371/13 |
| 4,651,321 | 3/1987 | Woffinden et al. | 371/38 |
| 4,653,055 | 3/1987 | Micic et al. | 371/69 |
| 4,706,249 | 11/1987 | Nakagawa et al. | 371/38 |
| 4,852,100 | 7/1989 | Christensen et al. | 371/38 |
| 4,995,041 | 2/1991 | Hetherington et al. | 371/40.1 |
| 5,012,472 | 4/1991 | Arimoto et al. | 371/40.1 |
| 5,043,943 | 8/1991 | Crisp et al. | 365/189.01 |
| 5,127,014 | 6/1992 | Raynham | 371/37.3 |
| 5,177,743 | 1/1993 | Shinoda et al. | 371/40.1 |
| 5,195,099 | 3/1993 | Ueda et al. | 371/40.1 |
| 5,233,610 | 8/1993 | Nakayama et al. | 371/5.1 |
| 5,239,509 | 8/1993 | Ikawa et al. | 371/40.1 |
| 5,331,645 | 7/1994 | Miller et al. | 371/37.1 |

FOREIGN PATENT DOCUMENTS

| | | |
|---|---|---|
| 0 528 234 | of 0000 | European Pat. Off. . |
| 0 540 450 | of 0000 | European Pat. Off. . |

OTHER PUBLICATIONS

"Detect/Correct Errors To Improve Data Reliability", Hedge, Electronic Design, vol. 40, No. 12, Jun. 11, 1992 pp. 75–76, 78, 80, 81, 83.

"Error Detection and Correction with the IDT49C466", Hedge, Microprocessors and Microsystems, vol. 18, No. 10, Dec. 1, 1994, pp. 613–620.

*Primary Examiner*—Reba I. Elmore
*Assistant Examiner*—McDieunel Marc
*Attorney, Agent, or Firm*—Adel A. Ahmed

[57] ABSTRACT

A semiconductor memory device is disclosed which includes an input terminal for receiving, and an output terminal for producing a data word, each having a predetermined number of bits. An internal memory array stores a plurality of error correcting encoded codewords each encoding more than one data word. An error correcting encoder is coupled between the input terminal and the memory array for generating an error correcting encoded codeword, encoding the received data word, and storing the codeword in the internal memory array. An error correcting decoder is coupled between the internal memory array and the output terminal to retrieve an error correction encoded codeword from the internal memory array, correct any detected errors, and produce one of the more than one data words encoded in the retrieved codeword at the output terminal.

2 Claims, 5 Drawing Sheets

FLEXIBLE ECC/PARITY BIT ARCHITECTURE

CROSS-REFERENCE TO RELATED APPLICATION

This is a continuation of Ser. No. 08/200,786 filed Feb. 22, 1994 now abandoned.

The present invention relates to an error detecting and correcting semiconductor memory device.

Currently available computer systems include some form of error detection for transmission of data through transmission paths within the computer system. For example, the transmission path between the system memory and central processor unit typically includes a data bus capable of transmitting, in parallel, a number of bytes of data (each of which includes 8 bits of data) and a parity bit for each byte. When each byte of data is placed on the bus, a parity bit is generated having a value to produce a nine-bit codeword having a predetermined parity (even or odd). When the data is received from the bus, the parity of the nine-bit codeword is checked. If the parity of the received codeword is not correct, then an error has been detected, and a diagnostic mode is invoked.

There are also known error correcting coding techniques, such as the Hamming code. Using such coding techniques, a plurality of data bits is combined with an additional plurality of code bits, or check bits, to generate a codeword. The codewords are generated in such a manner that not only may errors be detected, but also corrected. Such techniques provide the advantage of correcting errors without requiring the computer system to invoke any diagnostic mode. In fact, the computer system may remain unaware that any error has occurred. Such error correcting techniques are especially useful in memory devices which are subject to temporary data losses (soft errors), which do not indicate a permanent malfunction of the memory device.

However, the number of extra code bits required for error correction is larger than the single bit required for parity error detection. For an eight-bit data word, five code bits are required to provide single error correction/double error detection. But, the number of extra code bits per data bit decreases as the number of data bits increases. To provide single error correction/double error detection for 64 data bits, for example, eight code bits are required. Thus, for 64 data bits (eight bytes), one code bit per byte is required for single error correction/double error detection—the same number as for standard parity error detection for each byte.

U.S. Pat. No. 3,648,239, issued Mar. 7, 1972 to Carter et al., and U.S. Pat. No. 3,836,957, issued Sep. 17, 1974 to Duke et al., each describe a system in which a 72-bit wide system data bus carries eight bytes (64 bits) of data, and eight parity bits, one per data byte. A memory system includes write circuitry for receiving the 72 data and parity bits from the data bus, but storing 72-bit codewords, encoded with a single error correction/double error detection Hamming code. The memory system further includes read circuitry for reading the 72-bit Hamming encoded codewords, correcting single bit errors, if detected, and generating eight parity encoded codewords for transmission on the data bus. Only if a multiple bit error is detected is the processor notified of an error so that a diagnostic routine may be initiated.

Recently, in order to integrate most efficiently into computer systems incorporating parity encoded data buses, standardized semiconductor memory devices have been developed to interchange with external circuitry, in parallel, some multiple of nine-bit words, for example, nine bits or 18 bits, commonly known as by-nine (×9) or by-eighteen (×18) devices. Such chips provide a computer system with parity encoded data transfer to and from a memory including a single memory chip.

Figure 1:
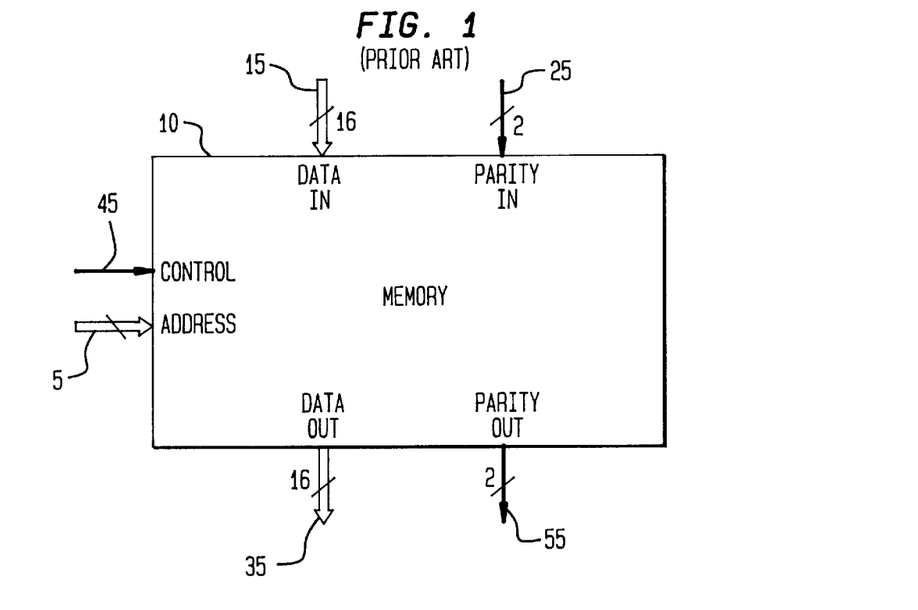
FIG. 1 is a block diagram of a prior art semiconductor memory device for storing parity encoded codewords.

FIG. 1 illustrates a circuit block diagram of an example of a by-18 semiconductor memory device 10. In FIG. 1 an input terminal 5 is coupled to an address input terminal of the semiconductor memory device 10. The address supplied to the address input terminal typically is time division multiplexed so that onehalf of the address bits are transmitted in a first cycle, and the second half during a second cycle. The number of address bits depends upon the capacity of the memory. In a typical example of a 64 megabit (64 Mb) memory device, there are 22 address bits time multiplexed in two 11-bit address cycles.

A data input terminal 15 is coupled to a data input terminal of the semiconductor memory device 10, and a data output terminal of the semiconductor memory device 10 is coupled to a data output terminal 35. These data input and output terminals are 16 bits wide. In addition, a parity input terminal 25 is coupled to a parity input terminal of the semiconductor memory device 10, and a parity output terminal of the semiconductor memory device 10 is coupled to a parity output terminal 55. There is one parity bit for each byte of the data input and output terminals, thus, there are two parity bits. The combination of the 16 data bits and the two parity bits totals 18 bits, making this a by-18 memory device.

Finally, a control signal input terminal 45 is coupled to a control input terminal of the semiconductor memory device 10. The signals at the control input terminal control the operation of the semiconductor memory device 10. The signals at the control input terminal include address sequencing signals such as row address strobe (RAS) and column address strobe (CAS) which are used to control the time multiplexing of the address signals. The signals at the control input terminal further include a write control signal (WR) to indicate that data is to be written into and an output enable signal (OE) to indicate that data is to be read from the memory device. Other control signals could also be included among the signals at the control input terminal.

In a write operation, a time multiplexed address is sent to memory device 10 over an address bus (not shown). Under control of the RAS and CAS signals, the address is accepted by memory device 10. In addition, an 18-bit parity encoded codeword is sent to the data input and parity input terminals of memory device 10 over a data bus (also not shown). In response to a WR signal, memory device 10 stores the 18-bit codeword in the addressed location in the memory array inside the memory device. In a read operation, an address is similarly transmitted to memory device 10. In response to an OE signal, memory device 10 retrieves the 18-bit codeword previously stored in the addressed location in the internal memory array, and transmits it over the data bus to the requester. The requester checks the parity of the received codewords, and invokes the diagnostic routine if the parity of any of the codewords in incorrect. No error detection or correction is performed in the semiconductor memory device 10, itself.

It is desirable to provide a semiconductor memory device, which can receive and store eight or 16-bit data words, or nine or 18-bit parity encoded codewords from a system data bus; and retrieve and provide those data words or parity encoded codewords to the system data bus, while storing error correcting encoded codewords internally, and performing error detection and correction when the stored codewords are retrieved.

In accordance with principles of the present invention, a semiconductor memory device includes an input terminal for receiving, and an output terminal for producing a data word having a predetermined number of bits. An internal memory array stores a plurality of error correcting encoded codewords each encoding more than one data word. An error correcting encoder is coupled between the input terminal and the memory array for generating an error correcting encoded codeword, encoding the received data word, for storage in the internal memory array. An error correcting decoder is coupled between the internal memory array and the output terminal to retrieve an error correction encoded codeword from the internal memory array, correct any detected errors in the retrieved codeword, and produce one of the data words which was encoded in the retrieved codeword at the output terminal.

Figure 2:
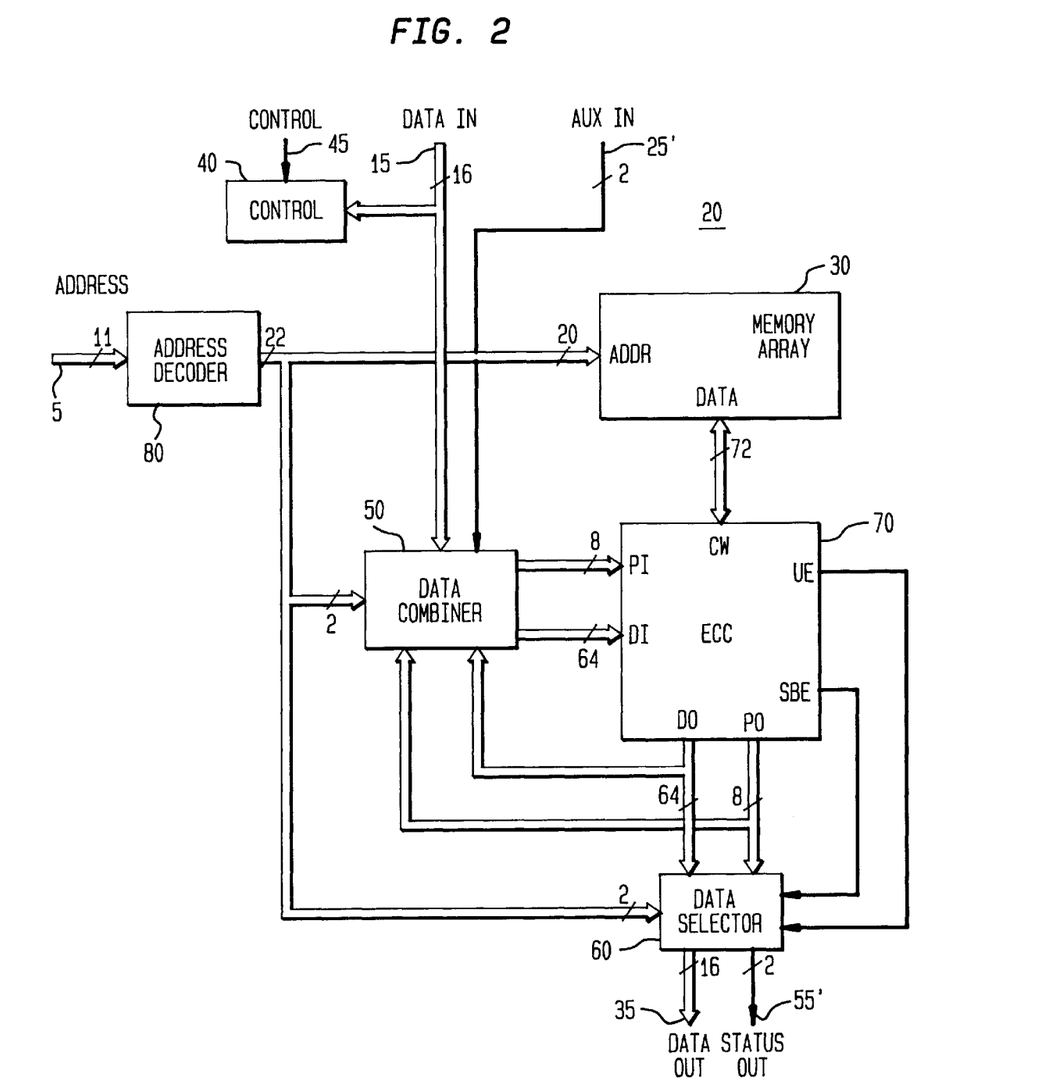
FIG. 2 is a block diagram of a semiconductor memory device in accordance with principles of the present invention.

FIG. 2 is a block diagram of a semiconductor memory device 20 in accordance with principles of the present invention. In FIG. 2, elements corresponding to similar elements in FIG. 1 are designated by the same reference number, and are not described in detail. In FIG. 2, signal lines which carry multibit signals are designated by a slash across the signal line next to the number of bits in that signal line.

The semiconductor memory device 20 operates as a 64 megabit dynamic RAM array, storing 4 million (or more accurately $2^{22}$=4,194,304) 16 bit data words. However, in actual arrangement, the semiconductor memory device 20 stores 1 million (or more accurately $2^{20}$=1,048,576) 72-bit error correcting encoded codewords, each codeword composed of 64 data bits (eight data bytes or four 16-bit data words) and eight code bits (one for each data byte). To address a particular 16-bit data word in the semiconductor memory device 20, 20 of the 22 address bits select a desired 72-bit codeword within the internal memory array, and the remaining two address bits are used to select a desired data word within the selected 72-bit codeword.

In FIG. 2 a control input terminal 45 is coupled to a source (not shown) of signals for controlling the operation of the semiconductor memory device 20, such as a system control bus. These control signals include standard memory control signals, e.g. RAS, CAS, WR, and OE. Control input terminal 45 is coupled to an input terminal of a control circuit 40. Control circuit 40 is the general controlling circuit of the semiconductor memory device 20 and includes controlling signal output terminals coupled to every element of semiconductor memory device 20. Controlling signals from the control circuit 40 also control the refresh circuitry for the internal memory array. Details of the circuitry in the control circuit 40 for performing the above functions is well known and will not be further discussed. In order to simplify the figure, none of these controlling signal connections have been shown, but one skilled in the art of semiconductor memory device design would understand what controlling signals are required by which other elements in the semiconductor memory device 20, and would understand how to generate these controlling signals and disseminate them to the required locations.

An 11-bit address input terminal 5 is coupled to a source of address signals (not shown), such as a system address bus. Address input terminal 5 is coupled to an input terminal of an address decoder circuit 80. Address decoder circuit 80 includes a 22-bit address output terminal. A first portion of the address output terminal of the address decoder circuit 80, consisting of 20 bits, is coupled to an address input terminal of an internal memory array 30. A second portion of the address output terminal of the address decoder circuit 80, consisting of the remaining two bits, is coupled to respective address input terminals of a data combiner 50 and a data selector 60.

A 16-bit (two byte) data input terminal 15 is coupled a source of data signals (not shown), such as a system data bus. The data input terminal 15 is coupled to an input terminal of a control circuit 40 and a first data input terminal of the data combiner 50. A 2-bit auxiliary input terminal 25' is coupled to source (also not shown) of auxiliary data. For example, in the data processing system described above, the auxiliary input terminal may be coupled to a source of parity input signals, one parity bit for each of the two bytes of input data at data input terminal 15, such as a system parity bus. Auxiliary input terminal 25' is coupled to an auxiliary input terminal of data combiner 50.

A 64-bit data output terminal of the data combiner 50 is coupled to a data input terminal DI of an error detection and correction encoder/decoder circuit (ECC) 70, and an eight-bit parity output terminal of the data combiner 50 is coupled to a parity input terminal PI of ECC 70. A 72-bit bidirectional data terminal CW of ECC 70 is coupled to a bidirectional data terminal of the internal memory array 30. A 64-bit data output terminal DO of ECC 70 is coupled to a second data input terminal of data combiner 50 and a data input terminal of data selector 60. An eight-bit parity output terminal PO of ECC 70 is coupled to respective parity input terminals of data combiner 50 and data selector 60. In addition, two single bit signal lines are coupled from the ECC 70 to the data selector 60. A first of these signal lines (SBE) indicates that a single bit error has been detected, and a second (UE) indicates that an unrecoverable error (multibit error) has been detected by the ECC 70.

A 16-bit data output terminal of data selector 60 is coupled to a data output terminal 35 of the semiconductor memory device 20. Data output terminal 35 of semiconductor memory device 20 is coupled to utilization circuitry (not shown), such as a system data bus, for accepting previously stored data retrieved from the semiconductor memory device 20. In addition, a two-bit status output terminal of data selector 60 is coupled to a status output terminal 55' of the semiconductor memory device 20. The status output terminal 55' of semiconductor memory device 20 is coupled to utilization circuitry (not shown), such as a system parity bus, for carrying the parity corresponding to data being provided at the data output terminal 35 of the semiconductor memory device 20.

Figure 6:
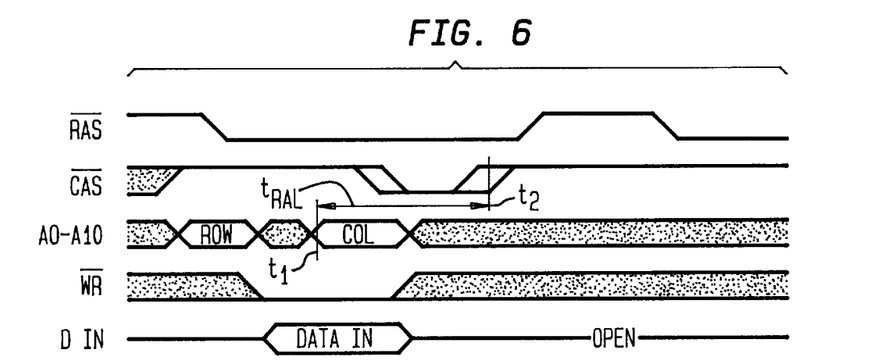
FIGS. 6 and 7 are waveform diagrams illustrating the timing of operating signals supplied to, and generated by the semiconductor memory device of FIG. 2.
Figure 7:
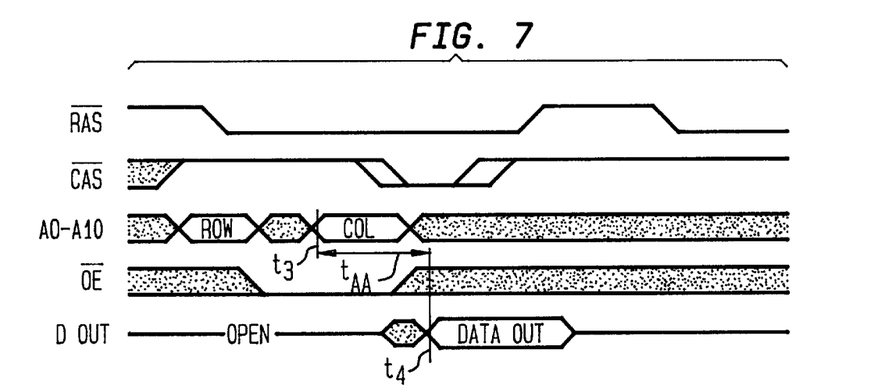

In operation, memory operations are initiated by supplying an address signal to the address input terminal 5, the appropriate control signals (RAS, CAS, WR and OE) to the control input terminal 45 and, if necessary, a data word to the data input terminal 15. FIGS. 6 and 7 are waveform diagrams illustrating 20 the timing of operating signals supplied to, and generated by, the semiconductor memory device 20 of FIG. 2. The operation of the semiconductor memory device 20 can be better understood by reference to the timing diagrams illustrated in FIGS. 6 and 7, and they will be referred to below.

The control circuit 40 responds to the control signals from control input terminal 45 and generates the necessary internal controlling signals for the other elements of the semiconductor memory device 20. These signals may include clocking signals, and gating signals for controlling circuitry and signal paths in the semiconductor memory device 20.

FIG. 6 is a waveform diagram illustrating the timing of external signals during a write operation. In a write operation, a time multiplexed address is accepted by the address decoder 80 under control of the RAS and CAS signals. In FIG. 6, the address signals are represented by the waveform designated A0–A10. The row address (ROW) is supplied on these signal lines and the RAS signal is asserted. Then the row address is removed, and the column address (COL) is supplied on the address signal lines and the CAS signal is asserted.

Address decoder combines the time multiplexed row and column address signals into a 22-bit address signal. In addition, waveform D IN represents a 16-bit data word, and the associated parity bits (DATA IN) supplied to the data input terminal 15 and auxiliary input terminal 25', respectively. These signal lines remain in open circuit, or high impedance condition otherwise. In response to the assertion of a write control signal, represented by the waveform designated WR, the previously stored codeword is retrieved from the addressed location in the internal memory array 30 and supplied to the ECC 70. This 72-bit codeword is the one which is to contain the newly received data word from data input terminal 15.

The ECC 70 decodes the retrieved codeword. During the decoding of the retrieved 72-bit codeword, errors are detected, and if correctable, corrected. If an error is detected and corrected, this is indicated by a signal produced at the single bit error (SBE) output terminal. If an uncorrectable (multibit) error is detected, this is indicated by a signal produced at the unrecoverable error (UE) output terminal. If no errors are detected, then neither of these signals are asserted. These signals are supplied to the data selector 60. Data selector 60 can couple these signals to the status output terminal of the semiconductor memory device 20. These signals may then be used by the system processor (not shown) for initiating a diagnostic routine, if desired.

The decoding of the 72-bit codeword by the ECC 70 will extract the four error-corrected 16-bit data words contained in that codeword. These data words are supplied to the data combiner 50 from the data output terminal DO of the ECC 70. The data combiner 50 inserts the newly received 16-bit data word from data input terminal 15 into the appropriate location in the 64-bit data word supplied from the ECC 70, as indicated by the address, to produce a newly constructed 64-bit data word. This newly constructed 64-bit data word is supplied to the ECC 70 which produces a new 72-bit error correcting encoded codeword. The ECC 70 supplies this new 72-bit codeword to the internal memory array 30 which rewrites it into the addressed location.

The read/combine/write operation can begin as soon as the column address is present on the address input terminal, i.e. time ti on FIG. 6. When the read/combine/write operation is completed, at time t2 on FIG. 6, then the semiconductor memory device 20 is ready to process the next memory request, which begins by the deassertion of the RAS signal. The time required to perform the read/combine/write operation is represented by the time $t_{RAL}$ illustrated between waveforms CAS and A0–A10 on FIG. 6.

FIG. 7 is a waveform diagram illustrating the timing of external signals during a read operation. In a read operation, address decoder 80 generates a 22-bit address signal in the same manner as in a write operation, as described above. In response to the assertion of an output enable signal OE, the previously stored codeword containing the desired data word is retrieved from the addressed location in the internal memory array 30 and supplied to the ECC 70.

The ECC 70 decodes the retrieved codeword, detects and corrects errors (if any) and reports any such errors on the SBE or UE signal lines. The decoding by the ECC 70 will extract the four error-corrected 16-bit data words contained in that codeword. These four data words are supplied to the data selector 80. Data selector 80 selects the appropriate data word, as indicated by the address signal, and supplies that data word to the data output terminal 35 of the semiconductor memory device 20, as represented by the waveform designated D OUT in FIG. 7. The retrieval of the previously stored data word from the internal memory array 30 can begin as soon as the column address is present at the address input terminal, illustrated as time t3 on FIG. 7. The time required to retrieve the previously stored 72-bit codeword from the internal memory array, correct detected errors in the codeword, and select the appropriate 16-bit data word from among the four the error corrected data words is designated $t_{AA}$ in FIG. 7 and ends at time t4.

The ECC 70 can also generate a parity bit for each byte of data contained in a retrieved codeword while that codeword is being decoded and error checked. The eight parity bits are also supplied to the data selector 80. The data selector may then select the two parity bits which correspond to the two bytes of 20 data in the selected data word. These parity bits may then be supplied to the status output terminal 55' of the semiconductor memory device 20. In this manner, a parity encoded codeword may be supplied to the system data bus for use by the remainder of the data processing system. This will be described in more detail below.

The sequencing of the standard memory control signals (RAS, CAS and WR) can also signal the semiconductor memory device 20 to accept data from the data input terminal 15 as control data. For example, the standard sequence of the standard memory control signals for a write operation is: first RAS is asserted, then WR is asserted, and finally CAS is asserted. If, however, these memory control signals are sequenced as follows: first CAS is asserted, then WR is asserted, and finally RAS is asserted, this sequence is termed a CWBR sequence (CAS,WR Before RAS). A CWBR sequence is used by the semiconductor memory device 20 to signal that eight bits of data from the data input terminal 15 contains control data. This control data may be used to cause the semiconductor memory device 20 enter a test mode. Alternatively, the internal data paths within the semiconductor memory device 20 may be controlled and different internal processing circuits activated and deactivated in response to controlling signals from the control circuit 40 to permit different operational modes.

For example, in the above described operational mode, 16-bit data words are received from data input terminal 15, merged with previously stored data words, error correcting encoded, and stored in the internal memory array 30 as 72-bit codewords. (Data from the auxiliary input terminal 25' is ignored in this mode.) Previously stored 72-bit codewords are retrieved from the internal memory array 30, and the addressed 16-bit data word is selected and supplied to the data output terminal 35 of semiconductor memory device 20. Two parity bits, respectively corresponding to the two bytes in the selected data word, are generated and supplied to the status output terminal 55' of the semiconductor memory device 20.

Another such operational mode is the ECC mode. In this operational mode, 16-bit data words are received from data input terminal 15, merged with previously stored data words, error correcting encoded, and stored in the internal memory array 30 as 72-bit codewords, in the manner described above. Previously stored 72-bit codewords are retrieved from the internal memory array 30, and the addressed 16-bit data word is selected and supplied to the data output terminal 35 of semiconductor memory device 20. In this operational mode, however, the two status signals from the ECC 70, SBE and UE, indicating a single bit error, and unrecoverable error, respectively, are supplied to the status output terminal 55' of the semiconductor memory device 20.

A parity mode of operation is similar to that of a standard by-18 memory device. In this operational mode the ECC encoding and decoding is deactivated. Instead, the 72-bit internal memory words stored in the internal memory array 30 consist of four 18-bit parity encoded codewords, each consisting of the combination of a 16-bit data word and two associated parity bits. Sixteen-bit (two byte) data words are received by the data input terminal 15 of the semiconductor memory device 20, and two bits of parity data, respectively associated with the two received data bytes, (or any other type of auxiliary data), are received by the auxiliary input terminal 25. The newly received 16-bit data word is combined with the associated two parity bits to form an 18-bit parity encoded codeword which is merged with previously stored codewords and stored in the internal memory array 30. Previously stored 72-bit parity encoded codewords are retrieved from the internal memory array 30, and the addressed 18-bit codeword consisting of the 16-bit data word and its associated two parity bits are selected and supplied to the data output terminal 35 and the status output terminal 55', respectively, of the semiconductor memory device 20.

Other modes of operation are possible. A semiconductor memory device designer would be able to design and build the controls for the data paths within the memory device 20 to accomplish any other such operational modes.

Figure 3:
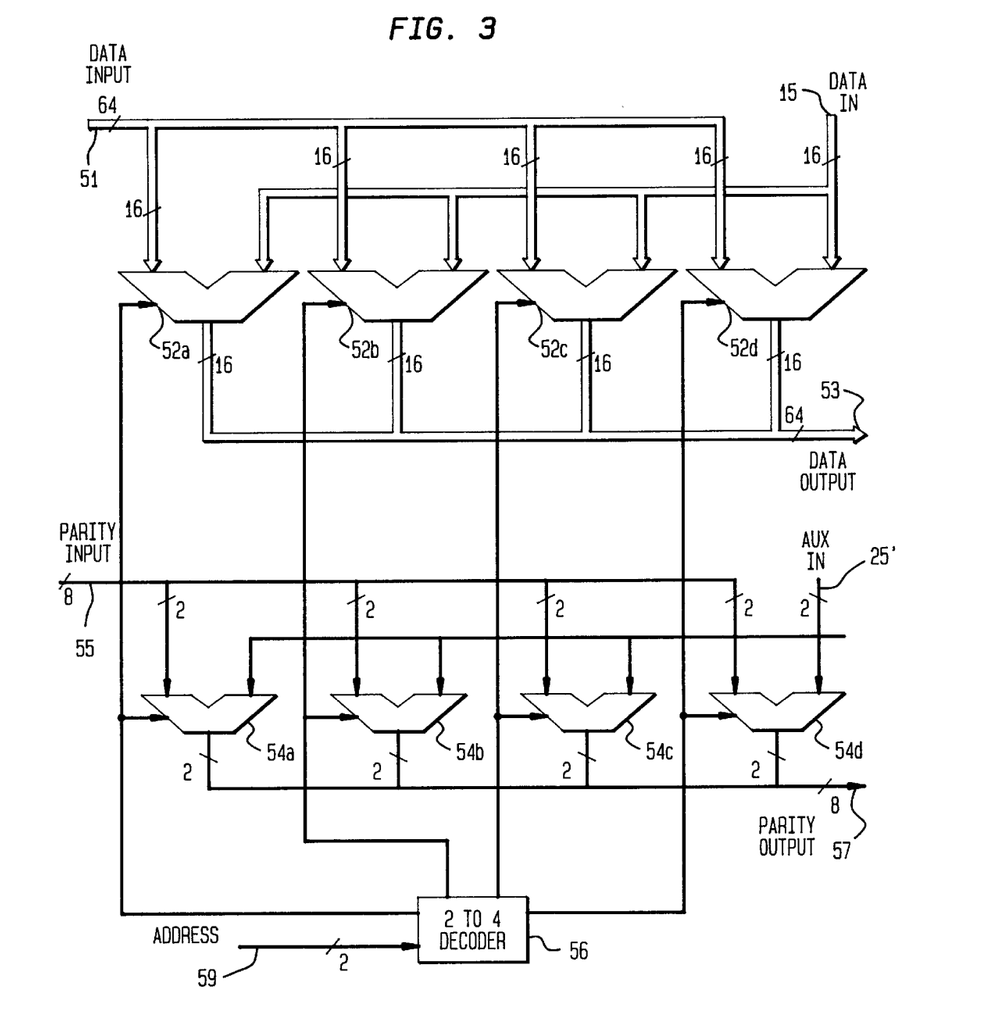
FIG. 3 is a block diagram of a data combiner in the semiconductor memory device of FIG. 2.

FIG. 3 is a block diagram of a data combiner 50 which may be used in the semiconductor memory device 20 of FIG. 2. In FIG. 3, a 64-bit data input terminal 51 is coupled to the data output terminal DO of ECC 70 (of FIG. 2). The 64-bits of data consist of four 16-bit data words, as described above. The four 16-bit data words from the data input terminal 51 are coupled to respective first data input terminals of four two input 16-bit multiplexers 52a–52d. Each of the 16-bit multiplexers 52a–52d has an output terminal producing a 16 bit output data word. The 16-bit data words at the output terminals of the 16-bit multiplexers 52a–52d are combined to produce a combined 64-bit output data word. This combined 64-bit output data word is coupled to the data output terminal 53. Data output terminal 53 is coupled to the data input terminal DI of ECC 70 (of FIG. 2). A 16-bit data input terminal is coupled to the data input terminal 15 of the semiconductor memory device 20 (of FIG. 2). Data input terminal 15 is coupled in common to respective second data input terminals of the 16-bit multiplexers 52a–52d.

An eight-bit parity input terminal 55 is coupled to the parity output terminal PO of ECC 70 (of FIG. 2). The eight parity bits at parity input terminal 55 include four pairs of parity bits, each pair corresponding to one data word at the data input terminal 51 (one parity bit for each byte in the data word), as described above. The four pairs of parity bits from the parity input terminal 55 are coupled to respective first input terminals of four two input 2-bit multiplexers 54a–54d. Each of the 2-bit multiplexers 54a–54d has an output terminal producing a 2-bit parity output word. The four 2-bit parity output words from the respective output terminals of the 2-bit multiplexers 54a–54d are combined to produce an eight-bit parity output word. This combined eight-bit parity output word is coupled to a parity output terminal 57. Parity output terminal 57 is coupled to the parity input terminal PI of ECC 70. A two-bit parity input terminal is coupled to the auxiliary input terminal 25' of the semiconductor memory device 20 (of FIG. 2). Parity input terminal 25' is coupled in common to respective second data input terminals of the two-bit multiplexers 54a–54d.

A two-bit address input terminal 59 is coupled to the address output terminal of address decoder 80 (of FIG. 2). Address input terminal 59 is coupled to an input terminal of a 2 to 4 decoder 56. A first output terminal of 2 to 4 decoder 56 is coupled to respective control input terminals of 16-bit multiplexer 52a and two-bit multiplexer 54a. A second output terminal of 2 to 4 decoder 56 is coupled to respective control input terminals of 16-bit multiplexer 52b and two-bit multiplexer 54b. A third output terminal of 2 to 4 decoder 56 is coupled to respective control input terminals of 16-bit multiplexer 52c and two-bit multiplexer 54c. And a fourth output terminal of 2 to 4 decoder 56 is coupled to respective control input terminals of 16-bit multiplexer 52d and two-bit multiplexer 54d.

In operation, the two-bit address supplied to address input terminal 59 indicates which of the four data words previously stored in the internal memory array 30 is to be replaced with newly received data from the data input terminal 15. The 2 to 4 decoder 56 operates in a known manner to produce a logic '1' signal on only one output terminal, and logic '0' signals on all the other output terminals, in response to the two-bit address signal from address input terminal 59. The 16-bit (52) and twobit (54) multiplexer coupled to the output terminal of the 2 to 4 decoder 56 producing the logic '1' signal are termed to be the addressed multiplexers.

Each of the 16-bit multiplexers 52a–52d and the twobit multiplexers 54a to 54d, produces at its data output terminal the signal at its first data input terminal when a logic '0' signal is presented to its control input terminal, and produces at its data output terminal the signal at its second data input terminal when a logic '1' signal is presented to its control input terminal, in known manner. Thus, the addressed 16-bit multiplexer produces at its output terminal the newly received data from the data input terminal 15, and the addressed two-bit multiplexer produces at its output terminal the newly received parity data from auxiliary input terminal 25'. All the non-addressed multiplexers produce at their output terminals the previously stored data words and corresponding parity bits. The newly generated 64-bit data word produced at the data output terminal 53, thus, consists of the retrieved previously stored 64-bit data word in which the newly received 16-bit data word has been inserted into the addressed location, and the newly generated eight-bit parity output word produced at the parity output terminal 57 consists of the retrieved previously stored eight parity bits corresponding to the retrieved 64-bit data word in which the two newly received parity bits have been inserted in the addressed location corresponding to the location in the data word into which the newly received data word has been inserted.

Figure 4:
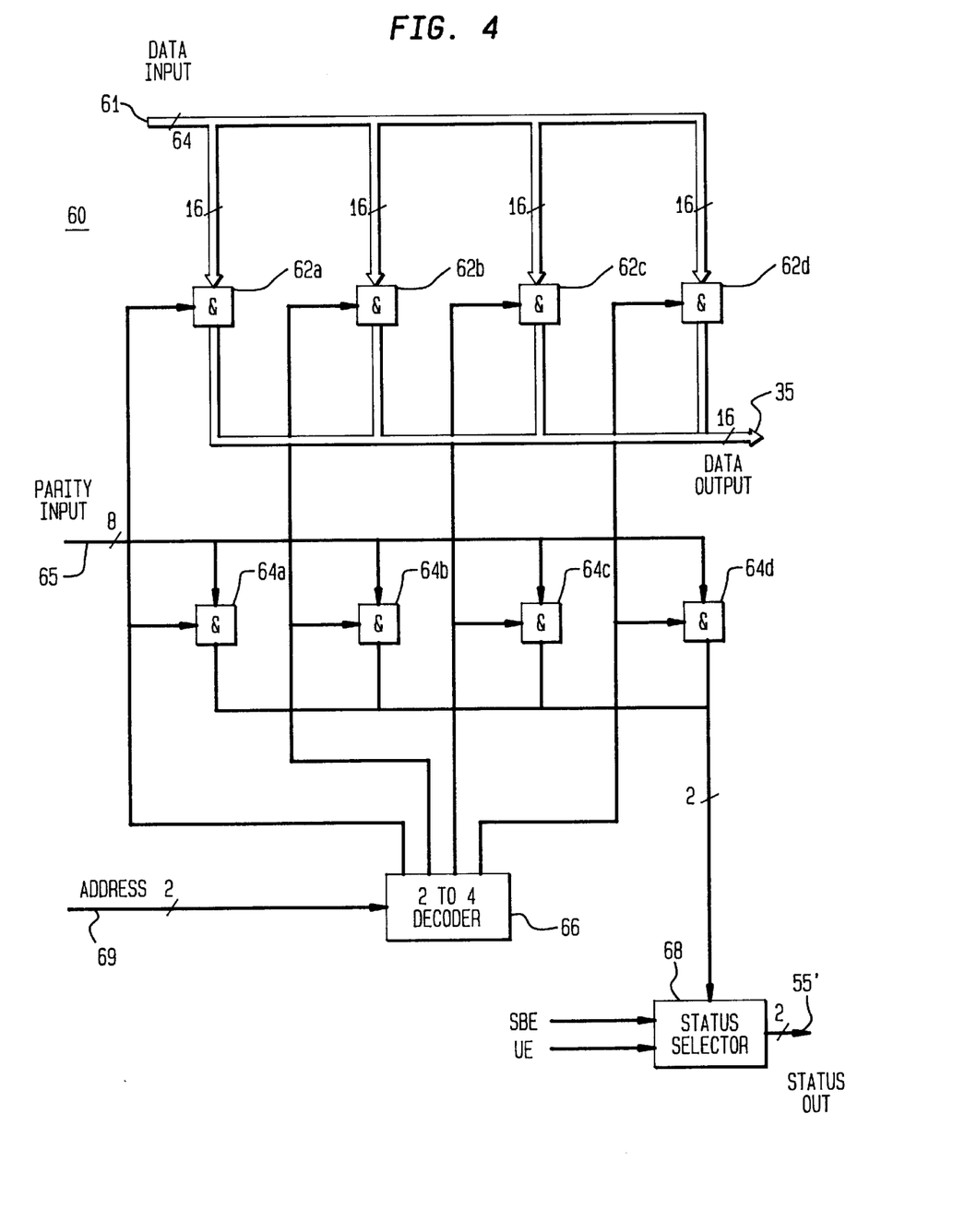
FIG. 4 is a block diagram of a data selector in the semiconductor memory device of FIG. 2.

FIG. 4 is a block diagram of a data selector 60 which may be used in the semiconductor memory device 20 of FIG. 2. In FIG. 4, a 64-bit data input terminal 61 is coupled to the data output terminal DO of ECC 70 (of FIG. 2). The 64 bits of data consist of four 16-bit data words, as described above. The four 16-bit data words from the data input terminal 51 are coupled to respective first input terminals of four 16-bit AND gates 62a–62d. Each of the 16-bit AND gates 62a–62d has an output terminal producing a 16-bit output data word. The output terminals of the 16-bit AND gates 62a–62d are coupled in common to the 16-bit data output terminal 35 of the semiconductor memory device 20.

An eight-bit parity input terminal 65 is coupled to the parity output terminal PO of ECC 70 (of FIG. 2). The eight parity bits at parity input terminal 55 include four pairs of parity bits, each pair corresponding to one data word at the data input terminal 61 (one parity bit for each byte in the data word), as described above. The four pairs of parity bits from the parity input terminal 65 are coupled to respective first input terminals of four 2-bit AND gates 64a–64d. Each of the 2-bit AND gates 64a–64d has an output terminal producing a 2-bit parity output word. The 2-bit parity output words from the respective output terminals of the 2-bit AND gates 64a–64d are coupled in common to a first input terminal of a status selector circuit 68. Two additional input terminals, SBE and UE, are coupled to the SBE and UE output terminals, respectively, of the ECC 70 (of FIG. 2). Input terminals, SBE and UE, are coupled to second and third input terminals of status selector 68. A two-bit output terminal of status selector 68 is coupled to the status output terminal 55' of the semiconductor memory device 20 (of FIG. 2).

A two-bit address input terminal 69 is coupled to the address output terminal of address decoder 80 (of FIG. 2). Address input terminal 69 is coupled to an input terminal of a 2 to 4 decoder 66. A first output terminal of 2 to 4 decoder 56 is coupled to respective control input terminals of 16-bit AND gate 62a and two-bit AND gate 64a. A second output terminal of 2 to 4 decoder 66 is coupled to respective control input terminals of 16-bit AND gate 62b and two-bit AND gate 64b. A third output terminal of 2 to 4 decoder 66 is coupled to respective control input terminals of 16-bit AND gate 62c and two-bit AND gate 64c. And a fourth output terminal of 2 to 4 decoder 66 is coupled to respective control input terminals of 16-bit AND gate 62d and two-bit AND gate 64d.

In operation, the two-bit address supplied to address input terminal 69 indicates which of the four data words encoded in the retrieved codeword from the internal memory array 30 is to be supplied to data out put terminal 35 of the semiconductor memory device 20. The 2 to 4 decoder 66 operates in the same manner as 2 to 4 decoder 56 (of FIG. 3), and will not be discussed further. The 16-bit (62) and two-bit (64) AND gates coupled to the output terminal of the 2 to 4 decoder 66 producing the logic '1' signal are termed to be the addressed AND gates.

Each of the 16-bit AND gates 62a–62d and the two-bit AND gates 64a to 64d, passes the signal at its data input terminal to its data output terminal only when the signal at its control input terminal is a logic '1', in a known manner. The four 16-bit AND gates 62a–62d may be constructed as four sets of 16 parallel two input AND gates with 16 parallel four in put OR gates having their respective input terminals coupled to the outputs of the four sets of 16 parallel two input AND gates. Or the AND gates may be constructed of four sets of 16 open collector AND gates, or they may be constructed of 16 controlled switches controlled in common by the signal at the control input terminal. One skilled in the art of semiconductor memory device design will understand how to construct the AND gates in the optimum manner.

The 16-bit signal at the data output terminal 35 of semiconductor memory device 20 consists of the addressed 16-bit data word from among the four data words in the 64-bit data word retrieved from the internal memory array 30 (of FIG. 2). The two-bit signal at the outputs of the two input AND gates 64a–64d consists of the pair of parity bits generated in the ECC 70 (of FIG. 2) corresponding to the addressed 16-bit word which is being produced at the data output terminal 35. These parity bits are supplied to the status selector 68, along with the single bit error and unrecoverable error indications from ECC 70. The status selector has further control input terminals (not shown) which are coupled to the control circuit 40 (of FIG. 2), as described above. In response to the signals at these control input terminals, status selector 68 may couple to the status output terminal 55' of the semiconductor memory device 20: the two parity bits from AND gates 64a–64d, or the single bit error SBE and unrecoverable error UE indications from the ECC 70 to the status output terminal 55', or any combination of two of these four signals, in accordance with the selected operational modes, as described above.

Figure 5:
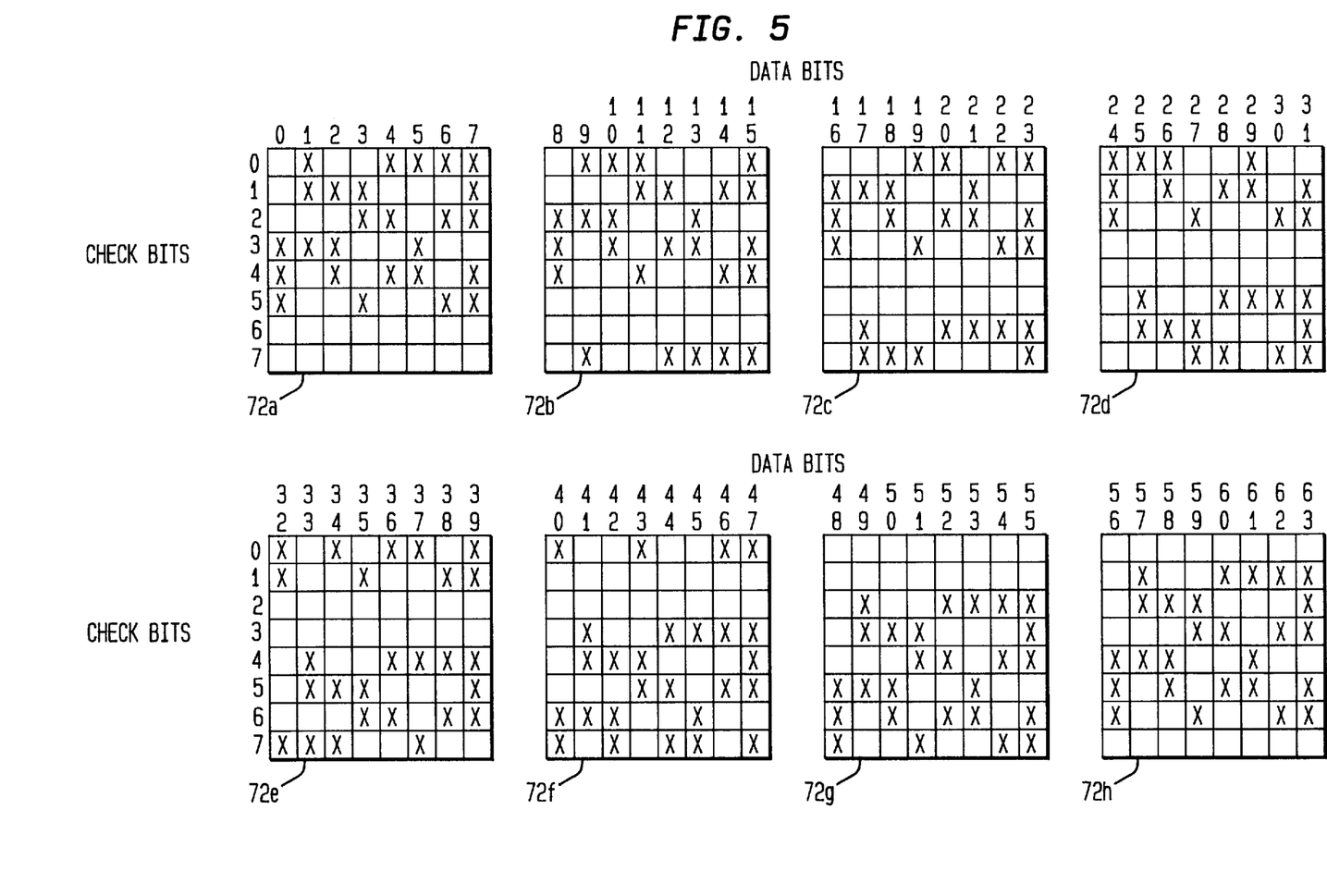
FIG. 5 is a diagram of a Hamming matrix illustrating how the error correction code is generated in the semiconductor memory device of FIG. 2.

FIG. 5 is a diagram of a Hamming matrix which may be used in the ECC 70 (of FIG. 2). This matrix represents, in known notation, the processing performed in the ECC 70 to generate the 72-bit error detecting and correcting codeword supplied to the internal memory array 30 (of FIG. 2) from the 64-bit combined data word from data combiner 50 (of FIG. 2). The matrix consists of eight squares 72a–72h, each with eight columns and eight rows. The top row of each square represents bit 0 of the check bits, the second row represents bit 1, and so forth to the bottom row which represents bit 7 of the check bits. Each column of the eight squares (64 in total) represents a mutually different data bit. Each square, thus, represents a different byte of data in the 64-bit data word. To generate a check bit, the row of the matrix (all eight squares) representing that check bit is traversed. The data bit represented by any column in which there is an X, in that row, is exclusive-ORed with the other such data bits. The result of that exclusive-ORing is that check bit.

Each square of the matrix has the same pattern of X's as the preceding square, but rotated up one row. That is the top row of square 72b is the same as the second row of square 72a; the second row of square 72b is the same as the third row of square 72a, and so forth. The bottom row of square 72b is the same as the top row of square 72a. Thus, square 72b is square 72a rotated upward one row. Square 72c is square 72b rotated upward one row, and so forth. Square 72a is square 72h rotated upward one row. This arrangement allows a single circuit, performing the processing represented by a single square, to be used eight times, to produce eight components of each check bit. The exclusive-OR of the eight components produces the check bit. Each use of the eight uses of the single circuit takes eight mutually different sets of eight data bits, and suitably rotates the check bit component results to accurately generate the eight components of the check bits. In addition, it should be noted that two rows of every square, e.g. rows 6 and 7 of square 72a, are blank. These rows in each square do not enter into the exclusive-OR calculations, and do not require circuitry to process. A system with blank rows is known (see U.S. Pat. No. 3,648,239, discussed above), and will not be described in more detail below.

It should also be noted that rows 2 and 3 of square 72a (and the corresponding rows of the other squares, as rotated upward) include X's in all of the columns in a mutually exclusive manner. If the results of the exclusive-OR operation represented by these two rows are, themselves, exclusive-ORed, the result is an even parity bit (which may be inverted to generate an odd parity bit) for the byte represented by that square. The eight parity bits (one for each row in the matrix) thus generated are produced at the parity output terminal PO of ECC 70 (of FIG. 2). The use of the Hamming matrix to generate parity bits for each byte of data being error correction encoded is known (see U.S. Pat. No. 3,648,239, discussed above), and will not be described in more detail below.

However, the arrangement of the X's in the squares illustrated in FIG. 5 is different from arrangements known in the art. In prior art arrangements, the number of columns containing X's in any row of a square containing X's varies from one to eight. In the embodiment illustrated in FIG. 5, either four or five X's occur in any row containing X's. This provides a simpler implementation on the semiconductor chip in which the semiconductor memory device is fabricated.

The semiconductor memory device 20 illustrated in the drawing, and discussed in the corresponding description provides single bit error correction and double bit error detection for the stored data, but requires slightly extra memory access times to perform the error detection and correction function. Specifically, time period tRAL during a write operation and time period $t_{AA}$ during a read operation are longer than they would be in an otherwise similar prior art semiconductor memory device for a write or read of an isolated address. However, this time penalty disappears when the semiconductor memory device is operated in a serial mode, such as a static column mode. In this case a 72-bit codeword is retrieved from the internal memory array in only one of every four memory access cycles, and the error detection and correction operation can take place in the time it takes for the four data words contained in the codeword to be accessed.

What is claimed is:

1. A semiconductor memory device, comprising:
   an input terminal for receiving a data word having a predetermined number of bits;
   an output terminal for producing a data word having the predetermined number of bits;
   an auxiliary input terminal for receiving auxiliary data associated with the received data word;
   a status output terminal for producing status representative data associated with the data word produced at the output terminal;
   a control circuit for receiving control data and producing controlling signals;
   an internal memory array for storing a plurality of memory storage words, each one of the plurality of memory storage words containing more than one data word;
   a combining circuit, coupled to the input terminal, the auxiliary input terminal and the internal memory array, for producing a memory storage word including the received data word as one of the more than data words;
   an error correcting encoder, coupled between the combining circuit and the internal memory array, for generating an error correcting encoded codeword encoding the memory storage word produced by the combining circuit
   an error correcting decoder, coupled to the internal memory array, for receiving an error correcting encoded codeword from the internal memory array, correcting detected errors in the retrieved codeword, and producing a retrieved memory storage word containing more than one data word encoded in the retrieved codeword; and
   a selection circuit, coupled to the internal memory array, the error correcting decoder, the output terminal and the status output terminal, for selecting one of the more than one data words in the retrieved memory storage word, and supplying the selected data word to the output terminal;
   wherein:
   the control circuit generates controlling signals to selectively configure the semiconductor memory device to operate in one of a first mode of operation, and a second mode of operation, in response to received control data;
   when operating in the first mode of operation:
      the combining circuit produces the memory storage word further including the auxiliary information associated with the received data word for storage in the internal memory array; and
      the selection circuit further selects the auxiliary information associated with the selected data word from the error correction decoder and supplies the selected auxiliary information to the status output terminal; and
   when operating in the second mode of operation:
      the error correcting encoder supplies the error correcting encoded codeword for storage in the internal memory array;
      the error correcting decoder further generates a plurality of parity bits associated with each one of the more than one data words encoded in the retrieved error correcting encoded codeword; and
      the selection circuit further supplies the generated parity bits associated with the selected data word to the status output terminal.

2. The semiconductor memory device of claim 1, wherein:
   the error correcting decoder further generates an ECC status signal indicative the results of the correction of detected errors in the retrieved error correcting encoded codeword; and
   when operating in the second mode of operation, the ECC status signal is selectively coupled to the status output terminal in response to controlling signals from the control circuit.

* * * * *